3,148,141
PROCESS AND APPARATUS FOR THE PURIFICATION OF HIGH MOLECULAR SOLUTIONS
Max Schönenberger, Marbach, near Marburg (Lahn), and Georg Erbach, Marburg (Lahn), Germany, assignors to Behringwerke Aktiengesellschaft, Marburg (Lahn), Germany, a corporation of Germany
Filed July 6, 1961, Ser. No. 122,202
Claims priority, application Germany July 9, 1960
7 Claims. (Cl. 210—22)

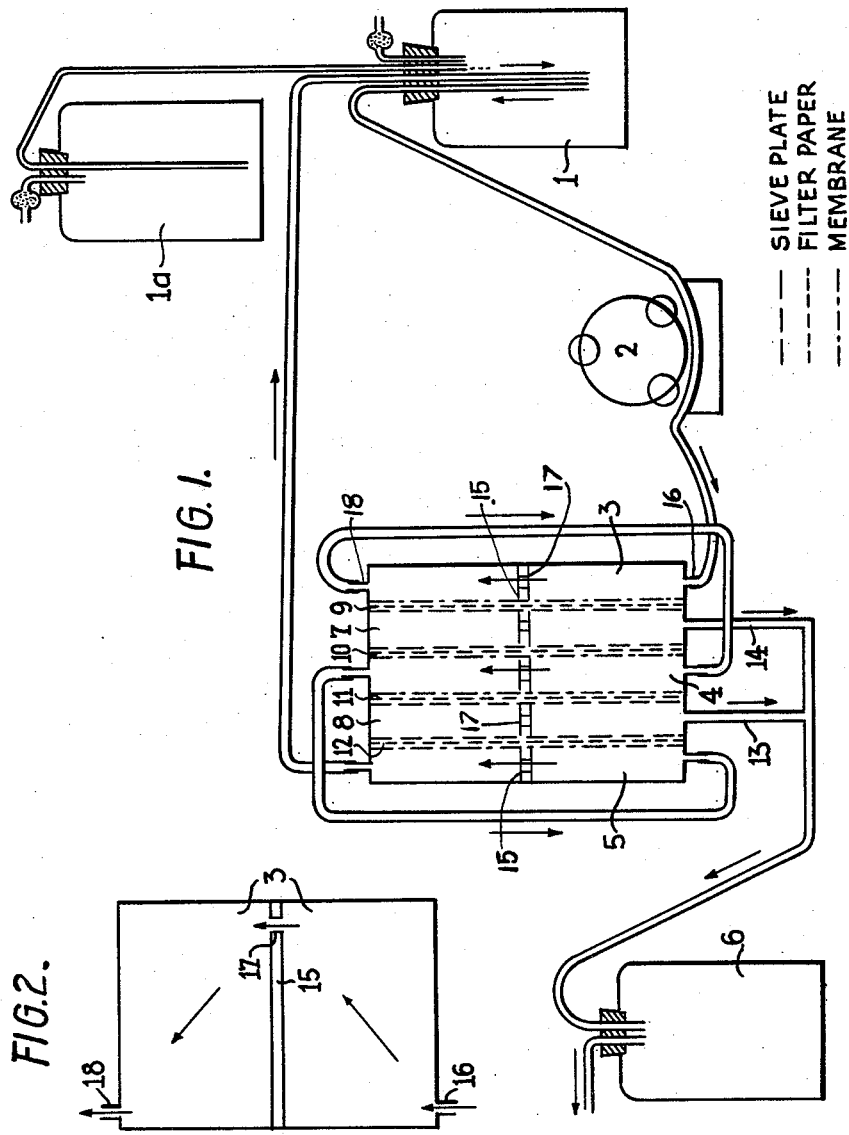

The present invention relates to a process and an apparatus for the purification of high molecular solutions, in particular salt-containing protein solutions, from dialyzable by-products.

Apparatuses and processes for the purification of solutions by dialysis have already been described in the literature. G. Wegelin (Kolloid-Zeitschrift, 18, 225, 1916) proposes a funnel-shaped container whose upper part is closed by an ultra-filter and in which the solution to be purified is perfused from below by the washing liquid. This apparatus has the disadvantage of being of only limited capacity and that weeks or months of operation are necessary to complete purification, because the low molecular particles enrich in the lower part of the vessel and their upward movement through the ultra-filter proceeds only slowly. Wegelin also states that the filter would clog after a certain period so that the test must be interrupted to insert a new ultra-filter.

R. Signer et al. (Helv. Chim. Acta, 29, 1948, 1949; 30, 334, 1947) describe a method allowing partial fractionation of two substances having different diffusion coefficients, for example, sodium chloride and sodium sulfate. The solution containing both substances is several times subjected to evaporation in an evaporator and to dialysis in a dialysis cell. This method has the disadvantage that it does not yield pure substances, but enriched fractions only and that the solutions must be transferred several times from the evaporator to the dialysis cell and back to the evaporator. This procedure is very cumbersome and entails heavy losses.

Now, we have found a process for the purification of high molecular solutions from dialyzable by-products, wherein the high molecular solutions are first concentrated by means of the ultra-filtration apparatus hereinafter described, then diluted to a greater volume by means of a solvent, and then again subjected to ultra-filtration.

This process is not encumbered by the drawbacks of the old methods since it permits purification of great quantities of high molecular solutions within considerably reduced periods of time with low consumption of solvent and with negligible loss, from low molecular by-products, for example, inorganic salts, dyestuffs, or amino acids. The solutions to be purified are not exposed to the risk of bacterial contamination, since they remain in the apparatus during the process and need not be transferred to a dialysis cell.

The process of the present invention is preferably carried out by so many times repeating concentration of the solution by ultra-filtration and dilution, until the high molecular weight substance has the desired concentration. Substances which are to be contained in the final solution may be dissolved in the solvent to be used. The solvent may also be added slowly and dropwise. If the solvent, for example, distilled water is to be added dropwise, the addition may be made to last for a prolonged period of time. If the air pipe to the storage container is then closed, only such a quantity of solvent will be allowed to drop in as is discharged as an ultra-filtrate. This arrangement is a particular, advantageous feature of the apparatus of the present invention because it makes survey of the apparatus during continuous, dropwise addition of solvent unnecessary.

The accompanying drawing shows an embodiment of the invention:

Referring to this drawing, the ultra-filtration apparatus of the present invention comprises a storage container 1, another storage container 1a containing pure solvent, mounted above the said container 1 and connected with it, a hose pump 2, or alternatively a closed rotary pump, substance chambers 3, 4, 5 arranged intermittently alongside each other and connected with one another by pipes, and vacuum chambers 7, 8 arranged intermittently and connected with one another by pipes and additionally with a collecting vessel 6 intended for taking up the filtrate, each of the vacuum chambers being separated from the substance chambers by semi-permeable membranes 9, 10, 11, 12. The solution to be filtered is circulated by pump 2 from storage container 1 through substance chambers 3, 4, 5 back to container 1, while a partial vacuum of preferably 15–50 mm. Hg is produced in the vacuum chambers 7, 8 by a vacuum pump over the collecting vessel 6 and the vacuum pipes 13, 14. The substance chambers may be divided by separating walls into two or more compartments, the inlets and outlets of each of these compartments being so arranged as to cause the solution to be purified to flow diagonally alongside the membranes.

The individual chambers are formed by plastic or metal frames placed one upon another, the external closing walls being plates from plastic, metal or glass, preferably attached to the last frame at either side. All frames are held together by a metal clamp. Towards the substance chambers 3, 4, 5 the vacuum chambers 7, 8 are closed each time by a sieve plate. A semi-permeable membrane is placed on the sieve plate in such a manner that it faces the substance chambers. For preserving the membrane, it is of advantage to place a filter paper of equal size between sieve plate and membrane. It is further of advantage when the substance chambers 3, 4, 5 are divided by horizontal slats (FIGURE 2, numeral 15) into two or more compartments. These slats are provided with an opening 17 which assures access from the lower to the upper compartment. The bottom inlet 16 of the chamber, the hole 17 through the slat, and the discharge opening 18 are so positioned that the liquid is caused to flow, twice or several times, diagonally alongside the membrane. The contact surfaces between the substance chambers and the vacuum chambers are sealed by rubber plates cut out in corresponding shape. The substance chambers and the vacuum chambers which succeed intermittently one another are connected with one another by pipes. The first and the last substance chambers are connected with the storage container, the first at the bottom, the second at the top. The vacuum chambers are connected with the container serving for taking up the filtrate.

The hose pump 2 comprises a motor whose axis is extended at one side. To this extended axis is attached a disc provided with three small wheels capable of rotating around their respective axes. A plastic hose is fastened to the bottom plate of the electric motor in such a manner that at each revolution of the motor axis it is successively squeezed by the three small wheels. If this hose contains liquid, this liquid is pushed forward a certain distance while new liquid is aspirated which again is pushed farther by the following wheel. The closed rotary pump which may be used alternatively instead of hose pump 2 comprises three chambers each of which is connected with the next one by small openings. The central chamber is provided with an impeller which, when rotating, aspirates the solution from one substance chamber and transfers it to the next one.

The storage container 1 is closed by a rubber stopper provided with four holes. One hole serves for the pipe supplying the ultra-filtration device, one for the discharge conduit from the ultra-filtration device, one for an air pipe, and the last one for the pipe supplying solvent from storage container 1a.

The filtrate container 6 is closed by a rubber stopper having two holes, one leading to the ultra-filtration device and the other to a vacuum pump. The container should be tested by application of low pressure which at least should correspond to the pressure used during ultra-filtration. To effect ultra-filtration, the solution to be concentrated is pumped by hose pump 2, or by the closed rotary pump, from storage container 1 into the first substance chamber 3 and then into the following substance chambers until it flows back into storage container 1. The solution to be purified is thus circulated from the storage container 1 into the ultra-filtration apparatus and therefrom back into the storage container 1. The vacuum pump is then put into operation and produces a moderate partial vacuum of about 15–50 mm. Hg behind the membranes.

The use of a hose pump in the ultra-filtration apparatus permits circulation of the solution in continuous stream. This advantageous feature of the apparatus of the present invention, i.e. the use of a hose pump for producing a circular flow, is of considerable importance, because a hose pump is not only a simple design, low in price and maintenance cost, but also does not require special maintenance. The sole part of the hose pump that comes into contact with the solution to be purified is a piece of plastic hose 20 cm. long. This piece can be sterilized in simple manner, for example, by application of a formaldehyde solution of 2.0% strength.

Apart from the hose pump the closed rotary pump which may alternatively be used is also very suitable for carrying out the process of the present invention. This pump, too, is of simple construction, low in price and does not require special maintenance. It can rapidly be sterilized from pathogenic germs by application of a formaldehyde solution of 2.0% strength.

Further, it proved very advantageous to have the substance chambers once or several times divided (cf. FIGURE 2). The openings giving access from one compartment to the next, are always in the opposite corners of the compartments so that the stream of liquid is caused to pass through each compartment diagonally alongside the membrane. This arrangement allows complete and even utilization of the whole surface of the membrane so that at no place of the chamber the flow is slowed down or even stopped.

The principle of the purification according to the present invention consists in first strongly concentrating the high molecular solutions by ultra-filtration in the above-described ultra-filtration apparatus, then diluting the filtrate by means of a solvent supplied from storage container 1a and again concentrating the dilution. This operation can be repeated as desired. If the content of salt appears to be sufficiently low, the concentrated solution is diluted so as to have the original volume. By this concentrating operation the high molecular substances are enriched, whereas the concentration of the low molecular by-products is not changed because they are eliminated by the solvent through the ultra-filter. Their concentration is then diminished by the dilution and remains at this diminished degree during the following concentration.

It also proved suitable to add to the solvent substances, for example, buffer salts, which are to be present in the final solution. The process of the present invention thus allows exchange of high molecular weight substances against other substances.

The following examples illustrate the invention but they are not intended to limit it thereto:

*Example 1*

40 liters of beef serum albumin solution of 1% strength containing 1.5% of sodium chloride were concentrated by ultra-filtration in the afore-mentioned apparatus provided with a colloid membrane (described in Houben-Weyl, I/1, page 659, by H. E. Schultze: Dialyse, Elektrodialyse) to a volume of 2 liters. The solution had a content of common salt of 1.53%. The solution thus obtained was diluted with 8 liters of distilled water to give a volume of 10 liters. The salt content was thereby reduced to 0.33%. The whole was then again concentrated to a volume of 2 liters, the salt content remaining at 0.36%. The analysis data showed that the salt content was reduced to one fifth, whereas the beef albumin was enriched to 2.3%.

Whereas in the starting solution the ratio of beef albumin to common salt was 1:15, it amounted in the final solution to 6.5:1. Referred to the albumin concentration, the concentration of the common salt was reduced to less than one hundredth part. The operation required about 8 hours.

*Example 2*

40 liters of inactivated poliomyelitis virus of the type II, $MEF_1$, were treated in the ultra-filtration apparatus in order to remove the phenol red present in the starting solution.

In the first stage of the process, the starting solution was concentrated in a manner analogous to that described in Example 1 to a volume of 2.5 liters, then diluted to a volume of 25 liters, again concentrated to 2.5 liters and made up to a volume of 12.5 liters. By final concentration the solution was given a volume of 2.5 liters. Phenol red has a maximum extinction at a wave length of 425 m$\mu$. The extinction values at this wave length were determined in each process step and the values obtained are listed below:

| | | |
|---|---|---|
| Starting solution | 40 liters | ε 425 mμ. |
| Stage I | 2.5 liters | 0.9 |
| Stage II | 25 liters | 0.09 |
| Stage III | 2.5 liters | 0.09 |
| Stage IV | 12.5 liters | 0.017 |
| Stage V | 2.5 liters | 0.017 |

The phenol red was thus eliminated in the ultra-filtration apparatus to a remainder of about the one thousandth part. The purification required 18 hours.

*Example 3*

The sodium chloride in 10 liters of solution containing 10% of beef albumin and 10% of sodium chloride, obtained by ultra-filtration according to the method described in Example 1 from 100 liters of beef albumin solution of 1% strength, was reduced in the ultra-filtration apparatus by removing at the same speed the sodium chloride-containing solution as 10 liters of distilled water were dropwise added. The volume was not changed in the 5 hours process.

The starting solution had a content of common salt of 10%, the final solution of 3.9% and the ultra-filtrate 6.1%. With equal volume the content of common salt was thus reduced to 39%, referred to the starting solution to 3.9%.

We claim:

1. An apparatus for the purification of high molecular solutions from low molecular weight compounds, which comprises a first storage container, another storage container for pure solvent and mounted above said first container connected with said first container, a hose pump, substance chambers arranged intermittently alongside each other and connected with one another, vacuum chambers which are likewise arranged intermittently alongside each other, connected with one another and additionally with a collecting vessel for the filtrate, any one of these chambers being separated from the next one by semipermeable membranes.

2. A process for the purification of high molecular solutions from low molecular weight compounds, wherein the high molecular solutions are first concentrated by ultra-filtration, then diluted to a higher volume by addition of a solvent, and the dilution so produced is again subjected to ultra-filtration.

3. The process for the purification of high molecular solutions from low molecular weight compounds, wherein the solution to be filtered is circulated by a pump from the first storage container through substance chambers and back to said container while producing a low pressure ranging from 15–50 mm. Hg in vacuum chambers via a collecting vessel and vacuum pipes, and the filtrate is collected in said collecting vessel.

4. A process as defined in claim 2, wherein substances are dissolved in the solvent used which are to be contained in the final solution.

5. The process as claimed in claim 2, wherein the solvent is added dropwise and continuously, and the filtrate is discharged at the same speed.

6. The process as claimed in claim 2, wherein during the dropwise addition of solvent the air pipe in the lower storage container is closed.

7. Ultrafiltration apparatus for separating a high molecular weight solute from a low molecular weight solute in a solvent which comprises a first storage vessel for the solution, a second storage vessel for the pure solvent, a plurality of chambers separated from one another by membranes permeable to the solvent and the low molecular weight solute but impermeable to the high molecular weight solute, means interconnecting alternate chambers with one another for reception and passage therethrough of the solution, means for feeding the solution from the first storage vessel into and through said alternate chambers for return to said first storage vessel, means for maintaining the other chambers between said alternate chambers under reduced pressure, means for withdrawing low molecular weight solute and solvent from said other chambers, and means for feeding pure solvent from the second storage vessel to the first storage vessel to compensate for the volume of solvent and low molecular weight solute withdrawn from said other chambers.

References Cited in the file of this patent
UNITED STATES PATENTS

| | | |
|---|---|---|
| 2,127,791 | Stevens et al. | Aug. 23, 1938 |
| 2,864,506 | Hiskey | Dec. 16, 1958 |

OTHER REFERENCES

Weissberger: "Technique of Organic Chemistry," vol. III, part I, Separation and Purification, second edition (1956), Interscience Publishers, Inc., New York, pp. 711–718.